Figure 1:
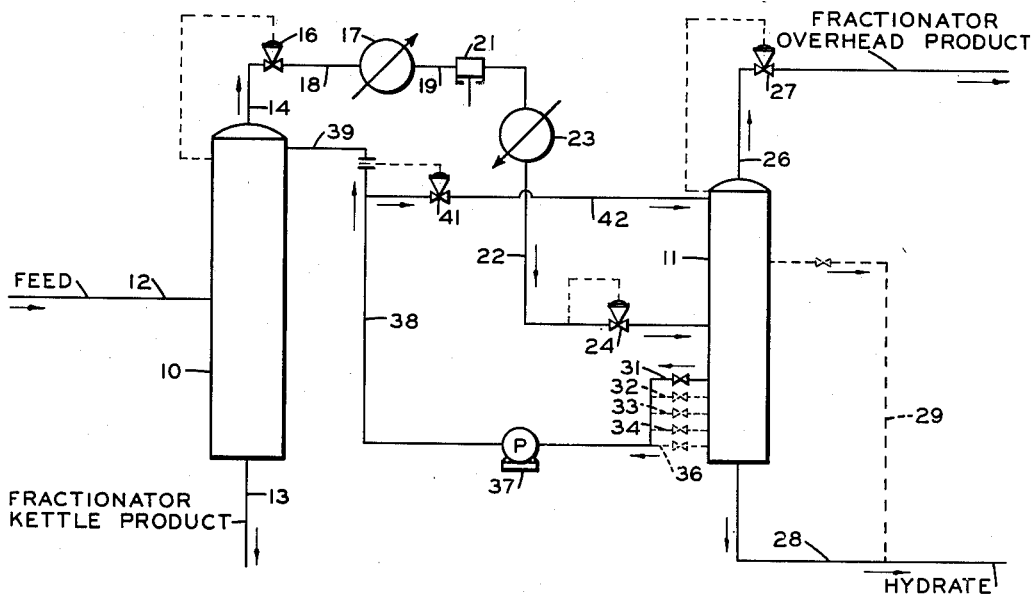

Jan. 24, 1956  F. D. STOOPS  2,732,414
PROCESS AND APPARATUS FOR REMOVING HYDRATES
FROM FRACTIONATOR OVERHEAD PRODUCT
Filed Nov. 19, 1951

INVENTOR.
F. D. STOOPS

BY Hudson and Young

ATTORNEYS

United States Patent Office 2,732,414
Patented Jan. 24, 1956

2,732,414

PROCESS AND APPARATUS FOR REMOVING HYDRATES FROM FRACTIONATOR OVERHEAD PRODUCT

Forrest D. Stoops, Bartlesville, Okla., assignor to Phillips Petroleum Company, a corporation of Delaware Application November 19, 1951, Serial No. 257,147

15 Claims. (Cl. 260—676)

This invention relates to the treatment of hydrocarbon streams for the removal of undesirable components. In one of its more specific aspects it relates to a deethanizing operation in which moist stock being deethanized contains hydrogen sulfide.

In another of its more specific aspects it relates to the removal of moisture and hydrogen sulfide from a fractionator overhead product.

The volatility of hydrogen sulfide is such that it falls between propane and ethane. In deethanization by fractional distillation, conventional practice is to take part of the propane overhead in order to have sufficient reflux liquid for cooling the top of the fractionator. Otherwise, it would be necessary to operate the fractionator at a sufficiently high pressure and low enough temperature to liquefy an overhead ethane product for production of reflux. Simultaneously, at least a part of the hydrogen sulfide will also be taken overhead.

By at least one of the aspects of this invention at least one of the following objects will be obtained.

An object of this invention is to provide a new method for the treatment of hydrocarbon streams.

A further object of this invention is to provide a method of and apparatus for removal of hydrate forming components of gas streams.

Still further objects and advantages will be realized by those skilled in the art upon reading the accompanying disclosure. The drawing illustrates certain embodiments of apparatus in diagrammatic form for carrying out the process of my invention.

In this invention it is proposed to separate hydrogen sulfide and dissolved water from a hydrocarbon mixture containing ethane and heavier components to prevent hydrate formation during fractionation. In ordinary fractionation operation the moisture and sulfides are likely to form hydrates. These hydrates appear as solid or semi-solid crystals which tend to plug the overhead lines and coolers. The result is that the fractionator must be shut down at more or less frequent intervals depending upon the hydrogen sulfide and moisture content of the charge stock to permit melting and removal of hydrates before proper operation can be resumed. In the present invention, only the fractionator overhead is passed into an accumulator under conditions favorable to the formation of hydrates. From this column a liquid hydrocarbon stream is returned to the fractionator as reflux, the substantially dry and desulfurized gas is taken off overhead, and the hydrates are removed from the accumulator.

Referring now to Figure 1, 10 represents the fractionator and 11, the accumulator. The fractionator 10 is provided with feed line 12, a kettle product removal conduit 13 and an overhead or product line 14. In this line there is a back pressure regulator 16, which is set to keep sufficient pressure in the fractionator column. Following this there is a heater 17 connected to the back pressure regulator 16 by means of conduit 18. Following heater 17 the gas enters conduit 19, and thereafter compressor 21. In line 22, there is provided a heat exchanger 23.

Another back pressure regulator 24 is located near the point at which the fractionator overhead enters accumulator 11. From the upper portion of accumulator 11 the overhead product is removed through line 26, the rate of removal being regulated by back pressure regulator 27. Hydrates formed in this column are removed from the lower portion of column 11 through line 28. A level of condensed hydrocarbon liquid is maintained in the accumulator, said level preferably being such that the accumulator is one-half full to substantially full. Dotted line 29 represents an auxiliary removal line, to be used in case the hydrates formed contain sufficient gas so that they float. Reflux hydrocarbon liquid is withdrawn through lines 31, 32, 33, 34 and 36, passed through pump 37, reflux return conduits 38 and 39 to the top of fractinator column. A portion of this reflux, controlled by valve 41, is returned to column 11 through line 42.

Figure 2:
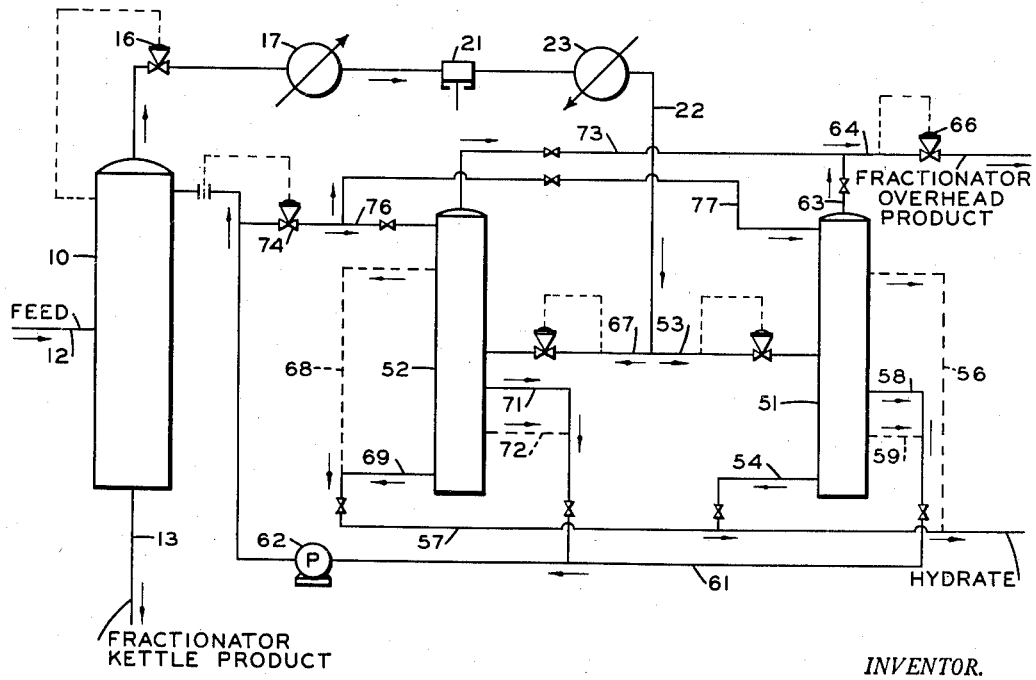

In Figure 2, wherein like numbers refer to similar parts, a modification of this apparatus is shown wherein multiple accumulators are used. The feed enters fractionator 10 through line 12 and the overhead receives the same treatment as in Figure 1, i. e., it passes through valve 16, heater 17, compressor 21, heater 23, and into line 22.

This modification varies from that shown in Figure 1 in that two accumulators 51 and 52 are provided. These accumulators, only one of which is on stream at any one time, are similar. That is to say, when the valves are set so that the overhead flows from line 22 into line 53, and into accumulator 51, there is no gas flowing into accumulator 52. Hydrates from column 51 flow through line 54 or 56 into common hydrate removal line 57. Reflux liquid is removed from column 51 by means of reflux supply conduit 58 or 59 and is conducted to common reflux return line 61, where pump 62 returns it to the top of fractionator 10. Overhead is removed from the upper portion of fractionator 51 by means of line 63, from which it flows into common overhead product line 64, this flow being regulated by back pressure regulator 66.

When accumulator 52 is put on stream the input flows through line 67. Lines 68 and 69 provide for removal of hydrates; reflux is taken off through reflux supply conduits 71 and 72; and the overhead flows through line 73. Valve 74 controls the amount of reflux liquid returned through lines 76 and 77 to accumulators 51 and 52.

In the operation of the process of my invention, a hydrocarbon charge containing hydrogen sulfide as an impurity and some dissolved moisture is charged to the fractionator 10 through feed line 12. I have found that this system is most efficient when this fractionator is operated under conditions of temperature and pressure so that the overhead will consist principally of ethane and lighter hydrocarbons, and the major amount of propane and heavier hydrocarbons will be removed as kettle products. Although temperature and pressure conditions will vary with the condition of the feed, the normal pressure range will be approximately 250 to 400 pounds absolute. The temperature range will normally vary from about 60° to 150° F. The overhead product is passed successively through a back pressure regulator 16 for maintaining the fractionating column operating pressure, a heat exchanger 17 to warm the gaseous product to a temperature which will leave it above hydrocarbon liquid and hydrate temperature formation level after compression, a compressor 21, a cooler 23, a back pressure regulator 24, and into accumulator tower 11 operated as a flash tower and absorber. The overhead product from fractionator 10 is flashed through back pressure regulator 24 under a liquid level maintained in the accumulator tower. In order to prevent the line between the back pressure regulator 24 and accumulator 11 from being plugged with hydrogen sulfide hydrate, this line should be as short as possible. The flashing of the fractionator overhead product into the accumulator will cool the product to hydrate formation temperature. Some of the hydrocarbons will also liquefy and will serve to establish the previously mentioned liquid level in the accumulator. The hydrates formed will normally precipitate in the accumulator where they can be removed from the bottom as a hydrocarbon and hydrogen sulfide hydrate slurry.

Normally, line 28 will take care of all the hydrates formed in the chamber. Sometimes, however, there is enough entrained gas in the hydrate to render it lighter than the hydrocarbon liquid in the accumulator tower. When this condition prevails, the hydrate floats and must be removed by means of line 29. This leaves the tower at approximately the level of the liquid hydrocarbon surface.

Reflux liquid for the fractionator 10 is obtained from the accumulator 11. Withdrawal is from a point above the level at which the hydrate precipitate accumulates and below the level of the liquid hydrocarbon in the accumulator. This is shown diagrammatically by means of lines 31, 32, 33, 34 and 36. Pump 37 forces this liquid back to the upper part of the towers. Any excess or a portion of this liquid may be recirculated through line 42 over the top of the accumulator tower as absorption liquid. Line 39 returns reflux liquid to the top of column 10.

Through conduit 26 a portion of the overhead from fractionator 10, is removed as ethane and lighter substantially free of hydrogen sulfide. The amount of withdrawal is controlled by back pressure regulator 27, so that sufficient pressure will be maintained in accumulator 11. The bottom product from the fractionator is removed through line 13.

Under some conditions of operation the hydrogen sulfide hydrate-hydrocarbon slurry will tend to pack in the bottom of the accumulator and not flow as indicated previously, thus making its withdrawal difficult or impossible. This will require frequent shutting-down of the fractionator while the hydrate in the accumulator is being melted so that it may be removed. In normal operation it is desirable to maintain continuous operation of the fractionation step. In Figure 2, I show an embodiment of this invention where two accumulator towers are provided. Of course, it would be possible to have more than two, but such considerations are a problem for engineering design considering the amount of hydrate which will be handled. In the modification of Figure 2, the overhead from fractionator 10 is passed into one of the accumulator towers. When this tower becomes inoperative because of hydrate formation, the gas can be switched to the second accumulator while the first is thawing to permit hydrate removal. Among the advantages provided by this invention is continuous fractionation or deethanization without interruption from plugging caused by hydrate accumulation in the deethanizing fractionator for the overhead product cooler. Hydrogen sulfide with moisture is the principal constituent in hydrocarbon hydrate. The temperature range over which hydrogen sulfide hydrate condenses is sufficiently great that in many deethanization operations effected by fractionation, changing of operating conditions to eliminate the hydrate will result in conditions outside the desired range for effective deethanization. Hydrocarbon hydrate congestion can often be avoided by such a change in operating conditions. This invention does not eliminate hydrate formation, but provides a means for localizing the hydrate formation at a point and in such a manner that the hydrates can be removed from the system without interrupting the fractionation step.

In Figure 1 the hydrate slurry is removed from accumulator 11 through line 28 and through suitable apparatus (not shown) for decomposing this slurry. When the hydrate decomposes a liquid hydrocarbon phase, a liquid water phase, and a gaseous hydrogen sulfide phase result. The water and hydrocarbon phases are saturated with hydrogen sulfide. The gaseous hydrogen sulfide is a relatively high concentrate. Such a gas could be used as a feed stock to a by-product operation, such as sulfur manufacture or mercaptan manufacture. In decomposing the solid hydrates in the column 51 or 52, Figure 2, the hydrate will usually be recovered as a slurry, and allowed to decompose and be separated in the same manner as set forth above. As an alternative it can be completely thawed and removed as a liquid. This thawing can be accelerated by use of a heater in heat exchange with each of said accumulators.

In refluxing the deethanizing fractionator with the accumulator liquid, there will be a limited amount of finely divided hydrates which may be carried into the fractionator. This does not render the invention ineffective since much more hydrate is being removed than returned and the hydrate concentration does not reach a critical point in the deethanizing fractionator.

From the above discussion of my invention, it will be seen that this process is most efficient for hydrate removal when used in connection with a deethanizing fractionator. When operating under conditions for deethanization, the moisture and hydrogen sulfide are taken off with the ethane overhead and the kettle product is a fraction containing propane and heavier hydrocarbons with very small amounts of the undesirable hydrate forming component. Subsequently, the hydrates are removed from this ethane overhead. It is possible, therefore, to treat a much smaller amount of gas in the accumulator column than would be necessary if the entire feed gas were to have the hydrate forming materials removed therefrom prior to the fractionation step. Propane is recovered without the problem of hydrate formation.

Many valves, pumps, gauges, flow and pressure controllers and the like are not shown in the drawing nor mentioned in the specification for purposes of simplicity. However, the need for the use of such auxiliary apparatus, its installation and operation are well understood by those skilled in the art.

As many possible embodiments may be made in this invention without departing from the scope thereof, it is to be understood that all matter herein set forth or shown in the accompanying drawings is to be interpreted as illustrative and not in a limiting sense.

I claim:

1. The method of treating a hydrocarbon stream containing water and sulfides, comprising separating said stream into a propane and heavier fraction and an ethane and lighter fraction in a fractionating zone; cooling said latter fraction to form hydrogen sulfide and hydrocarbon hydrates therein, and recovering ethane from the lighter fraction.

2. The method of treating a hydrocarbon stream containing water and sulfides, comprising separating said stream into a propane and heavier fraction and an ethane and lighter fraction in a fractionating zone, expanding said latter fraction to form hydrogen sulfide and hydrocarbon hydrates therein in a hydrate forming zone, recovering ethane from said lighter fraction, and refluxing liquid from the hydrate forming zone to the fractionating zone.

3. The method of recovering ethane from a hydrocarbon stream including hydrocarbons, water, and hydrogen sulfide, comprising removing propane and heavier in a deethanizing zone; removing ethane and lighter as overhead; heating, compressing, cooling, and flashing said overhead into a hydrate forming zone wherein hydrogen sulfide hydrate and ethane hydrate are formed and liquid hydrocarbons are condensed; removing the hydrates from said zone; and recovering an ethane and lighter stream as product.

4. The method of recovering ethane from a hydrocarbon stream including hydrocarbons, water, and hydrogen sulfide, comprising removing propane and heavier in a deethanizing zone; removing ethane and lighter as overhead; heating, compressing, cooling, and flashing said overhead into a hydrate forming zone wherein hydrogen sulfide hydrate and ethane hydrate are formed and liquid hydrocarbons are condensed; removing the hydrates from said zone as a slurry; and recovering an ethane and lighter stream as product.

5. The method of recovering ethane from a hydrocarbon stream including hydrocarbons, water, and hydrogen sulfide, comprising removing propane and heavier in a deethanizing zone; removing ethane and lighter as overhead; heating, compressing, cooling, and flashing said overhead into a first hydrate forming zone wherein hydrogen sulfide hydrate and ethane hydrate are formed and liquid hydrocarbons are condensed; recovering an ethane and lighter stream as product; diverting said overhead to a second hydrate forming zone from which the ethane and lighter overhead is recovered; and melting and removing the hydrate from said first hydrate forming zone so that it is available to be placed on stream when said second zone is filled.

6. The method of recovering ethane from a hydrocarbon stream including hydrocarbons, water and hydrogen sulfide, comprising removing propane and heavier in a deethanizing zone; removing ethane and lihgter as overhead; heating, compressing, cooling, and flashing said overhead into a hydrate forming zone wherein hydrogen sulfide hydrate and ethane hydrate are formed and liquid hydrocarbons are condensed; removing the hydrates from said zone; returning a portion of the liquid in the hydrate forming zone to the deethanizing zone as reflux; and recovering an ethane and lighter stream as product.

7. The method of recovering ethane from a hydrocarbon stream including hydrocarbons, water and hydrogen sulfide, comprising removing propane and heavier in a deethanizing zone; removing ethane and lighter as overhead, heating, compressing, cooling, and flashing said overhead into a first hydrate forming zone wherein hydrogen sulfide hydrate and ethane hydrate are formed and liquid hydrocarbons are condensed; recovering an ethane and lighter stream as product; returning a portion of the liquid in the hydrate forming zone to the deethanizing zone as reflux; diverting said overhead to a second hydrate forming zone from which the ethane and lighter overhead is recovered; and melting and removing the hydrate from said first hydrate forming zone so that it is available to be placed on stream when said second zone is filled.

8. A method for preventing hydrate formation in the equipment involved in refluxing a propane-ethane fractionator comprising, compressing and cooling the overhead from the fractionator; flashing said overhead into a reflux accumulation zone under conditions of temperature and pressure which are conducive to the formation of hydrogen sulfide hydrate and hydrocarbon hydrate; removing hydrates formed in said zone; returning liquid hydrocarbon formed in said zone to the fractionator as reflux; and recovering the balance of the overhead as product.

9. Apparatus for treating a hydrocarbon stream containing hydrocarbons, water and sulfides comprising a fractionator and a hydrate forming accumulator; a feed conduit extending into the central portion of said fractionator; a kettle product removal conduit in the lower portion of said fractionator; an overhead conduit from the upper portion of said fractionator to the central portion of said accumulator; a heater in said conduit; a compressor in said conduit downstream of said heater; a cooler in said conduit downstream of said compressor; a removal line leading from the lower portion of the accumulator; a reflux return conduit extending from a point above said removal line in the lower portion of the accumulator to the upper portion of the fractionator; a conduit extending from said reflux return conduit to the upper portion of the accumulator; and an overhead removal conduit extending from the upper portion of the accumulator.

10. Apparatus for treating a hydrocarbon stream containing hydrocarbons, water and sulfides comprising a fractionator and at least one hydrate forming accumulator; a feed conduit extending into the central portion of said fractionator; a kettle product removal conduit in the lower portion of said fractionator; an overhead conduit from the upper portion of said fractionator to the central portion of each accumulator; a removal line leading from the lower portion of each accumulator; a reflux return conduit extending from a point above said removal line in the lower portion of each accumulator to the upper portion of the fractionator; a conduit extending from said reflux return conduit to the upper portion of each accumulator; and an overhead removal conduit extending from the upper portion of each accumulator.

11. Apparatus for removal of hydrate forming components of a gas stream comprising a fractionator and multiple accumulators; a feed conduit into the central portion of the fractionator; a fractionator kettle product removal conduit; a fractionator overhead conduit connecting the upper portion of the fractionator and the central portion of each of said accumulators, hydrate removal conduits extending from the lower portion of each of said accumulators; reflux supply conduits extending from the lower portion of each of said accumulators above said removal conduits; a valve in each of said supply conduits; a reflux return conduit extending from the ends of said supply conduits to the upper portion of said fractionator; a conduit extending from said reflux return conduit and having branches extending to the upper portion of each of said accumulators; and overhead removal conduits extending from the upper portion of each of said accumulators.

12. Apparatus for removal of hydrate forming components of a gas stream comprising a fractionator and multiple accumulators; a feed conduit into the central portion of the fractionator; a fractionator kettle product removal conduit; a fractionator overhead conduit connecting the upper portion of the fractionator and the central portion of each of said accumulators; a heater in said overhead conduit; a compressor in said conduit downstream of said heater; a cooler in said conduit downstream of said compressor; hydrate removal conduits extending from the lower portion of each of said accumulators; reflux return conduits extending from the lower portion of each of said accumulators above said removal conduits to the upper portion of said fractionator; a conduit extending from said last-mentioned conduits having branches extending to the upper portion of each of said accumulators; overhead removal conduits extending from the upper portion of each of said accumulators; and a valve in each of said last-mentioned conduits.

13. Apparatus for removal of hydrate forming components of a gas stream comprising a fractionator and multiple accumulators; a feed conduit into the central portion of the fractionator; a fractionator kettle product removal conduit; a fractionator overhead conduit connecting the upper portion of the fractionator and the central portion of each of said accumulators; hydrate removal conduits extending from the lower portion of each of said accumulators; reflux return conduits extending from the lower portion of each of said accumulators above said removal conduits to the upper portion of said fractionator; a conduit extending from said last-mentioned conduits to the upper portion of each of said accumulators; overhead removal conduits extending from the upper portion of each of said accumulators; and a heater in heat exchange relationship with each of said accumulators.

14. The apparatus of claim 13 in which back pressure regulators are located in the overhead removal conduits extending from the fractionator and the accumulators.

15. The apparatus of claim 13 in which the hydrate removal conduits extend from the upper portion of said accumulators and the reflux return conduits extend from the lower portion of said accumulators.

References Cited in the file of this patent

UNITED STATES PATENTS

| | | |
|---|---|---|
| 1,142,525 | Maag | June 8, 1915 |
| 1,808,087 | Urquhart | June 2, 1931 |
| 1,949,616 | Messer | Mar. 6, 1934 |
| 1,958,554 | Van Nuys | May 15, 1934 |
| 2,284,112 | Walker et al. | May 26, 1942 |
| 2,399,723 | Crowther | May 7, 1946 |
| 2,690,989 | Bottenberg | Oct. 5, 1954 |

FOREIGN PATENTS

| | | |
|---|---|---|
| 568,292 | Great Britain | Mar. 28, 1945 |